US012688385B2

(12) United States Patent
Neelamegam Vetharaman

(10) Patent No.: US 12,688,385 B2
(45) Date of Patent: Jul. 21, 2026

(54) SYSTEM AND METHOD FOR BUILDING FAMILY NETWORK WITH INVITEES TO AN EVENT USING MACHINE-LEARNING MODEL

(71) Applicant: Gurunath Santhosh Neelamegam Vetharaman, Parsippany, NJ (US)

(72) Inventor: Gurunath Santhosh Neelamegam Vetharaman, Parsippany, NJ (US)

( * ) Notice: Subject to any disclaimer, the term of this patent is extended or adjusted under 35 U.S.C. 154(b) by 50 days.

(21) Appl. No.: 18/675,080

(22) Filed: May 27, 2024

(65) Prior Publication Data

US 2025/0363463 A1 Nov. 27, 2025

(51) Int. Cl.
| | |
|---|---|
| *G06Q 10/1093* | (2023.01) |
| *G06F 16/9536* | (2019.01) |
| *G06K 7/14* | (2006.01) |
| *G06Q 10/40* | (2026.01) |

(52) U.S. Cl.
CPC ..... *G06Q 10/1093* (2013.01); *G06F 16/9536* (2019.01); *G06K 7/1417* (2013.01); *G06Q 10/40* (2026.01)

(58) Field of Classification Search
CPC .. G06Q 10/1093; G06Q 50/01; G06K 7/1417; G06F 16/9536
See application file for complete search history.

(56) References Cited

U.S. PATENT DOCUMENTS

2015/0271126 A1* 9/2015 Menayas ................. H04L 51/52
709/206
2022/0357819 A1* 11/2022 Kozorezov ........ A61B 18/1492

* cited by examiner

*Primary Examiner* — Deirdre D Hatcher

(57) ABSTRACT

A processor-implemented method for building a family network with invitees to an event using a machine-learning model is provided. The method includes (i) generating an event invite using event information obtained from the user of the family network, (ii) sending the event invite to each of the invitees and a request for adding the invitee to the family network of the user, and (iii) automatically connecting the invitees with the family network of the user using the machine learning model. The machine learning model is configured to add the invitee who is the family member of the user to a family tree of the user, add the invitee who is a relative of the user to a relative section of the user's family network, and (iii) add the invitee who is the family friend of the user to a family friend section of the user's family network.

14 Claims, 12 Drawing Sheets

GENERATING AN EVENT INVITE USING EVENT INFORMATION OBTAINED FROM THE USER OF THE FAMILY NETWORK THROUGH AN INTERFACE OF A USER DEVICE, THE EVENT INFORMATION COMPRISES AT LEAST ONE OF A NAME OF THE EVENT, A START DATE AND TIME OF THE EVENT, AN END DATE AND TIME OF THE EVENT, AN END DATE FOR RECEIVING A CONFIRMATION MESSAGE FOR ATTENDING THE EVENT FROM THE INVITEES, A VENUE OF THE EVENT, A DESCRIPTION OF THE EVENT, AN INVITATION OF THE EVENT COMPRISING AN IMAGE OR A VIDEO OF THE EVENT, WEATHER FORECAST OF A LOCATION OF THE EVENT, A NAME OF A HOST OR A CO-HOST ORGANIZING THE EVENT, AND AN IMAGE OF THE HOST OR THE CO-HOST ORGANIZING THE EVENT
902

SENDING THE EVENT INVITE THROUGH A COMMUNICATION MODE COMPRISING AT LEAST ONE OF AN EMAIL, A TEXT MESSAGE OR A PUSH NOTIFICATION TO EACH OF THE INVITEES THROUGH A PHONE NUMBER OR AN EMAIL ID OF THE INVITEES, THE USER IS ENABLED TO PROVIDE A NAME OF THE INVITEE AND SELECT A RELATIONSHIP TYPE OF THE INVITEE, THE RELATIONSHIP TYPE COMPRISES THE FAMILY MEMBER, THE RELATIVE, OR THE FAMILY FRIEND OF THE USER, THE FAMILY MEMBER IS ONE OF A FATHER, MOTHER, SPOUSE, SON, DAUGHTER SIBLINGS, MATERNAL FATHER, MATERNAL MOTHER, PATERNAL FATHER, PATERNAL MOTHER, FATHER-IN-LAW, MOTHER-IN-LAW, GRANDSON, GRANDDAUGHTER, BROTHER-IN-LAW, SISTER-IN-LAW, MATERNAL AND PATERNAL AUNT, MATERNAL AND PATERNAL UNCLE, COUSIN BROTHER, COUSIN SISTER, GREAT-GRANDSON, GREAT-GRANDDAUGHTER, GREAT-GRANDFATHER, GREAT-GRANDMOTHER
904

SENDING A REQUEST TO THE EVENT INVITEE TO ADD THE EVENT INVITEE TO THE FAMILY NETWORK OF THE USER BASED ON THE DEFINED RELATIONSHIP TYPE WHILE INVITING THE INVITEE TO THE EVENT, THE INVITEE IS REQUIRED TO REGISTER AS THE USER IN THE FAMILY NETWORK
906

A

900

200

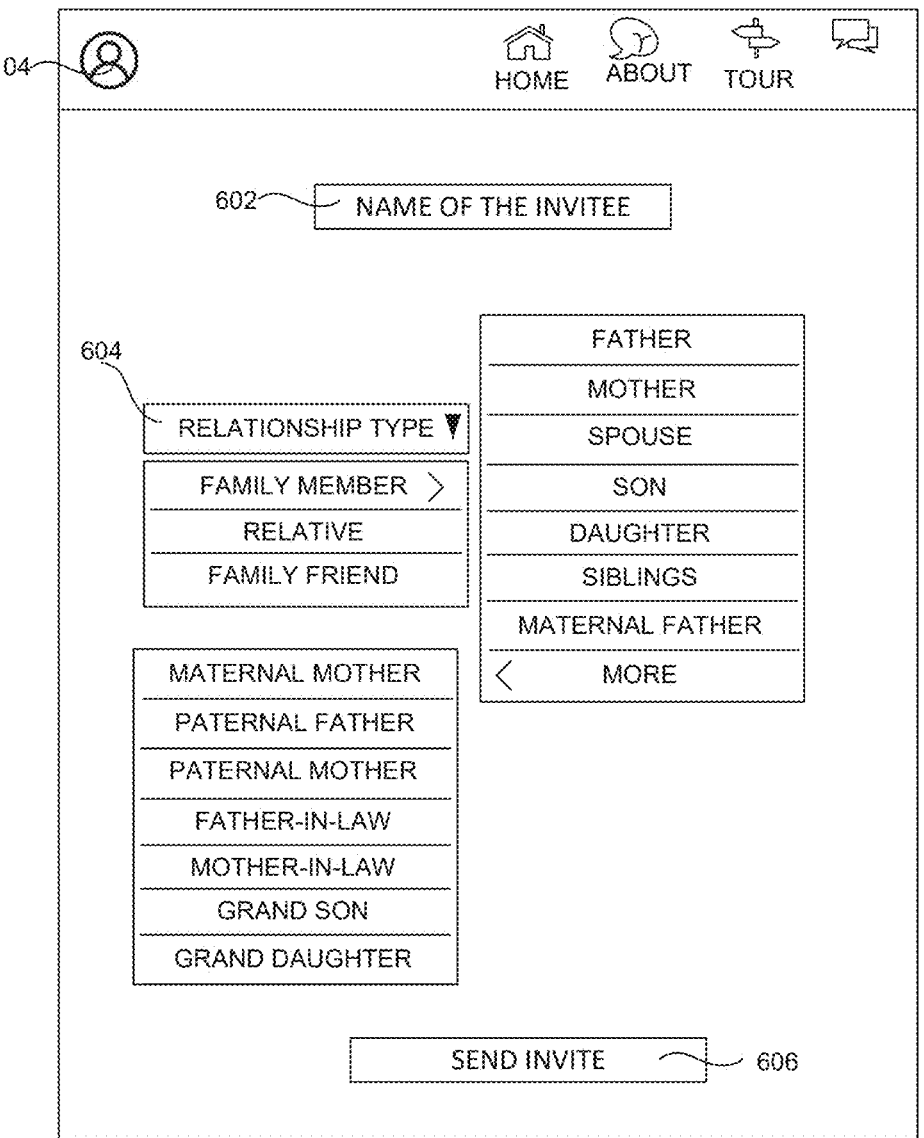
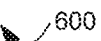
FIG.6

GENERATING AN EVENT INVITE USING EVENT INFORMATION OBTAINED FROM THE USER OF THE FAMILY NETWORK THROUGH AN INTERFACE OF A USER DEVICE, THE EVENT INFORMATION COMPRISES AT LEAST ONE OF A NAME OF THE EVENT, A START DATE AND TIME OF THE EVENT, AN END DATE AND TIME OF THE EVENT, AN END DATE FOR RECEIVING A CONFIRMATION MESSAGE FOR ATTENDING THE EVENT FROM THE INVITEES, A VENUE OF THE EVENT, A DESCRIPTION OF THE EVENT, AN INVITATION OF THE EVENT COMPRISING AN IMAGE OR A VIDEO OF THE EVENT, WEATHER FORECAST OF A LOCATION OF THE EVENT, A NAME OF A HOST OR A CO-HOST ORGANIZING THE EVENT, AND AN IMAGE OF THE HOST OR THE CO-HOST ORGANIZING THE EVENT

902

SENDING THE EVENT INVITE THROUGH A COMMUNICATION MODE COMPRISING AT LEAST ONE OF  AN EMAIL, A TEXT MESSAGE OR A PUSH NOTIFICATION TO EACH OF THE INVITEES THROUGH A  PHONE NUMBER OR AN EMAIL ID OF THE INVITEES, THE USER IS ENABLED TO PROVIDE A NAME OF THE INVITEE AND SELECT A RELATIONSHIP TYPE OF THE INVITEE, THE RELATIONSHIP TYPE COMPRISES THE FAMILY MEMBER, THE RELATIVE, OR THE FAMILY FRIEND OF THE USER, THE FAMILY MEMBER IS ONE OF A FATHER, MOTHER, SPOUSE, SON, DAUGHTER SIBLINGS, MATERNAL FATHER, MATERNAL MOTHER, PATERNAL FATHER, PATERNAL MOTHER, FATHER-IN-LAW, MOTHER-IN-LAW, GRANDSON, GRANDDAUGHTER, BROTHER-IN-LAW, SISTER-IN-LAW, MATERNAL AND PATERNAL AUNT, MATERNAL AND PATERNAL UNCLE, COUSIN BROTHER, COUSIN SISTER, GREAT-GRANDSON, GREAT-GRANDDAUGHTER, GREAT-GRANDFATHER, GREAT-GRANDMOTHER

904

SENDING A REQUEST TO THE EVENT INVITEE TO ADD THE EVENT INVITEE TO THE FAMILY NETWORK OF THE USER BASED ON THE DEFINED RELATIONSHIP TYPE WHILE INVITING THE INVITEE TO THE EVENT, THE INVITEE IS REQUIRED TO REGISTER AS THE USER IN THE FAMILY NETWORK

906

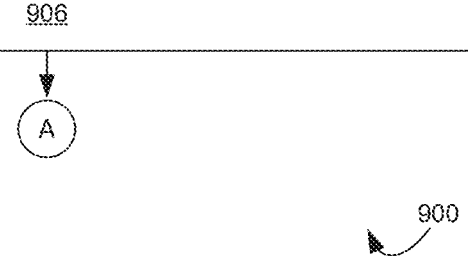

AUTOMATICALLY CONNECTING THE INVITEES OF THE EVENT WITH THE FAMILY NETWORK OF THE USER BY ADDING THE INVITEES TO THE FAMILY NETWORK OF THE USER USING A MACHINE LEARNING MODEL UPON RECEIVING AN ACCEPTANCE FOR THE REQUEST FROM THE INVITEE TO ADD THE INVITEE TO THE FAMILY NETWORK OF THE USER, THE MACHINE LEARNING MODEL IS CONFIGURED TO (I) ADD THE INVITEE WHO IS THE FAMILY MEMBER OF THE USER TO A FAMILY TREE OF THE USER, THE FAMILY TREE COMPRISES A PLURALITY OF BRANCHES THAT EXPOSE THE RELATIONSHIP BETWEEN THE USER AND FAMILY MEMBERS OF THE USER, (II) ADD THE INVITEE WHO IS THE RELATIVE OF THE USER TO A RELATIVE SECTION OF THE USER'S FAMILY NETWORK, AND (III) ADD THE INVITEE WHO IS THE FAMILY FRIEND OF THE USER TO A FAMILY FRIEND SECTION OF THE USER'S FAMILY NETWORK, THE MACHINE LEARNING MODEL AUTOMATICALLY SUGGEST THE RELATIONSHIP TYPE OF THE INVITEE TO THE USER BASED ON THE PROVIDED NAME, EMAIL ID OR PHONE NUMBER OF THE INVITEE IF THE INVITEES ARE ALREADY ADDED TO THE FAMILY NETWORK OF THE USER.

908

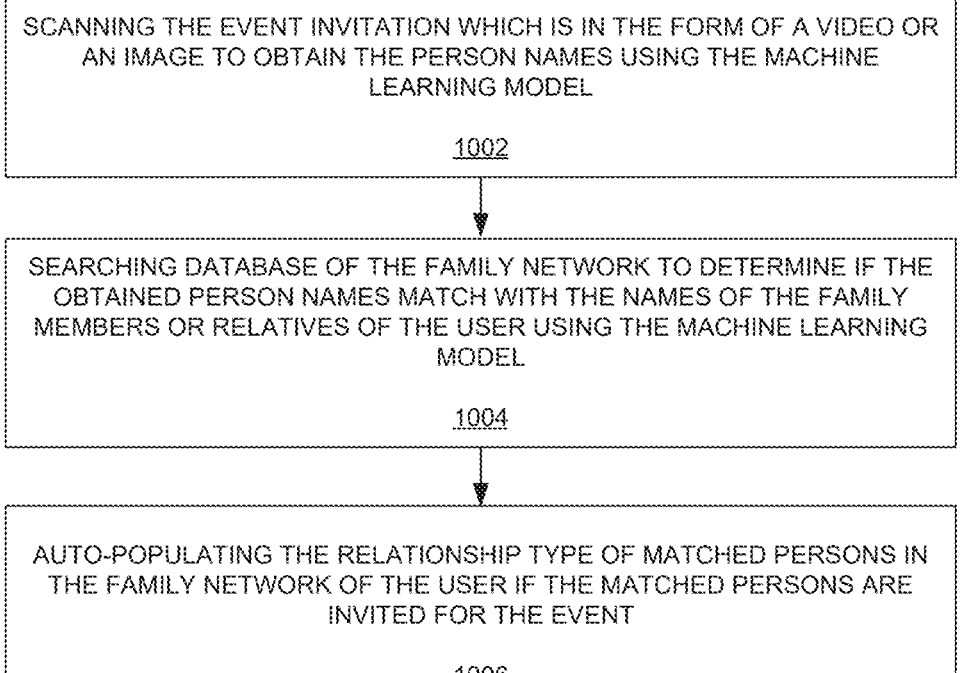

SCANNING THE EVENT INVITATION WHICH IS IN THE FORM OF A VIDEO OR AN IMAGE TO OBTAIN THE PERSON NAMES USING THE MACHINE LEARNING MODEL

1002

SEARCHING DATABASE OF THE FAMILY NETWORK TO DETERMINE IF THE OBTAINED PERSON NAMES MATCH WITH THE NAMES OF THE FAMILY MEMBERS OR RELATIVES OF THE USER USING THE MACHINE LEARNING MODEL

1004

AUTO-POPULATING THE RELATIONSHIP TYPE OF MATCHED PERSONS IN THE FAMILY NETWORK OF THE USER IF THE MATCHED PERSONS ARE INVITED FOR THE EVENT

SYSTEM AND METHOD FOR BUILDING FAMILY NETWORK WITH INVITEES TO AN EVENT USING MACHINE-LEARNING MODEL

BACKGROUND

Technical Field

Embodiments of this disclosure generally relate to family networking and more particularly, a system and a method for generating an event invite for a user of a family network comprising interconnected relationships and connections of the user's family members, relatives and family friends, connecting invitees of the event with the family network of the user based on relationships and building the family network with invitees of the event.

Description of the Related Art

Family networking, or the act of maintaining connections and relationships within one's family, holds significant importance for social support, emotional well-being and cultural transmission. Family networking strengthens bonds across generations, fostering relationships between grandparents, parents, children, and extended family members. These intergenerational connections provide a sense of continuity, legacy, and mutual understanding within the family unit. Further, family networking reinforces shared identity and values among family members. Through shared experiences, celebrations, and rituals, family members develop a common sense of identity and belonging, which strengthens their bonds and sense of cohesion.

Many family events are rooted in traditions and rituals that have been passed down through generations. By inviting family members to participate in these events, individuals contribute to the preservation of family traditions, ensuring that they continue to be cherished and upheld. Inviting family members to events ensures that they feel included and valued within the family network. By extending invitations to family events, individuals have the opportunity to strengthen their relationships with relatives. The invitee may have limited interaction with other family members during the event, making it challenging to establish meaningful connections or build rapport with the broader family network.

Existing family networking systems may not have established mechanisms or structures in place to facilitate ongoing engagement with invitees beyond the initial event. Without regular opportunities for interaction, it can be challenging to integrate invitees into the family network. A concerted effort is required to promote inclusivity, foster open communication, and create a supportive environment where invitees feel welcomed and valued.

Accordingly, there remains a need for an improved method and system for connecting invitees of the event with the family network of the user based on relationships and building the family network with invitees of the event.

SUMMARY

According to the first aspect of the present invention, a method for generating an event invite for a user of a family network including interconnected relationships and connections of the user's family members, relatives and family friends, connecting invitees of the event with the family network of the user based on relationships and building the family network with invitees of the event is provided. The method includes generating an event invite using event information obtained from the user of the family network through an interface of a user device. The event information includes at least one of the name of the event, start date and time of the event, end date and time of the event, an end date for receiving a confirmation message for attending the event from the invitees (i.e. RSVP), a venue of the event, a description of the event, an invitation of the event including an image or a video of the event, weather forecast of a location of the event, a name of a host or a co-host organizing the event, and an image of the host or the co-host organizing the event. The method includes sending the event invite through a communication mode including at least one of an email, a text message or a push notification to each of the invitees through a phone number or an email ID of the invitees. The user is enabled to provide the name of the invitee and select a relationship type of the invitee. The relationship type includes the family member, the relative, or the family friend of the user. The family member is one of a father, mother, spouse, son, daughter siblings, maternal father, maternal mother, paternal father, paternal mother, father-in-law, mother-in-law, grandson and granddaughter, brother-in-law, sister-in-law, maternal and paternal aunt, maternal and paternal uncle, cousin brother, cousin sister, great-grandson, great-granddaughter, great-grandfather, great-grandmother.

The method includes sending a request to the event invitee to add the event invitee to the family network of the user based on the defined relationship type while inviting the invitee to the event. The invitee is required to register as a user in the family network. The method includes automatically connecting the invitees of the event with the family network of the user by adding the invitees to the family network of the user using a machine learning model upon receiving an acceptance for the request from the invitee to add the invitee to the family network of the user. The machine learning model is configured to (i) add the invitee who is the family member of the user to a family tree of the user. The family tree comprises a plurality of branches that expose the relationship between the user and family members of the user, (ii) add the invitee who is the relative of the user to a relative section of the user's family network, and (iii) add the invitee who is the family friend of the user to a family friend section of the user's family network. The machine learning model automatically suggests the relationship type of the invitee to the user based on the provided name, email ID or phone number of the invitee if the invitees are already added to the family network of the user.

In some embodiments, the machine learning model is configured to obtain the name of the invitee from the invitation of the event and detect the relationship type of the invitee with the user from the family network using the machine learning model.

In some embodiments, the method enables the user to create a group for the family members, the relatives and the family friends invited for a previously held event and send the event invite to the created group.

In some embodiments, the method includes receiving from the invitees (i) a confirmation message for attending the event, and (ii) number of adults and kids attending the event.

In some embodiments, the method includes automatically generating a seating plan for invitees. The seating plan is generated based on the relationship type of the invitees with the user. The seating plan is generated based on the number of adults and kids attending the event.

In some embodiments, the method includes automatically generating the seating plan that assigns seats for the family members of the user next to each other. A notification is sent to the invitees after the seats are assigned.

In some embodiments, the method includes generating a digital event badge comprising the name of the invitee, the assigned seats and a QR code. An event organizer scans the QR code using a digital communication device to authenticate the invitees attending the event.

In some embodiments, the method includes notifying the host or the co-host of the event when the QR code of the digital event badge is scanned using the digital communication device by the event organizer.

In some embodiments, the method further includes automatically sending a welcome message and a "thank you" message to mobile devices of the invitees at the start date and end date of the event respectively based on location using GPS coordinates.

In some embodiments, the user is enabled to customize the welcome message and the "thank you" message during the generation of the event invite.

According to the second aspect of the invention, a system for generating an event invite for a user of a family network comprising interconnected relationships and connections of the user's family members, relatives and family friends, connecting invitees of the event with the family network of the user based on relationships and building the family network with invitees of the event is provided. The system includes a server that includes a memory that stores a set of instructions and a processor that executes the set of instructions and is configured to generate an event invite using event information obtained from the user of the family network through an interface of a user device. The event information includes at least one of the name of the event, start date and time of the event, end date and time of the event, an end date for receiving a confirmation message for attending the event from the invitees, a venue of the event, a description of the event, an invitation of the event includes an image or a video of the event, weather forecast of a location of the event, a name of a host or a co-host organizing the event, and an image of the host or the co-host organizing the event. The server is configured to send the event invite through a communication mode including at least one email, a text message or push notification to each of the invitees through a phone number or an email ID of the invitees. The user is enabled to provide the name of the invitee and select a relationship type of the invitee. The relationship type includes the family member, the relative, or the family friend of the user. The family member is one of a father, mother, spouse, son, daughter siblings, maternal father, maternal mother, paternal father, paternal mother, father-in-law, mother-in-law, grandson, granddaughter, brother-in-law, sister-in-law, maternal and paternal aunt, maternal and paternal uncle, cousin brother, cousin sister, great-grandson, great-granddaughter, great-grandfather, great-grandmother.

The server is configured to send a request to the event invitee to add the event invitee to the family network of the user based on the defined relationship type while inviting the invitee to the event. The invitee is required to register as a user in the family network. The server is configured to automatically connect the invitees of the event with the family network of the user by adding the invitees to the family network of the user using a machine learning model upon receiving an acceptance for the request from the invitee to add the invitee to the family network of the user. The machine learning model is configured to (i) add the invitee who is the family member of the user to a family tree of the user. The family tree comprises a plurality of branches that expose the relationship between the user and family members of the user, (ii) add the invitee who is the relative of the user to a relative section of the user's family network, and (iii) add the invitee who is the family friend of the user to a family friend section of the user's family network. The machine learning model automatically suggests the relationship type of the invitee to the user based on the provided name, email ID or phone number of the invitee if the invitees are already added to the family network of the user.

In some embodiments, the machine learning model is configured to obtain the name of the invitee from the invitation of the event and detect the relationship type of the invitee with the user from the family network using the machine learning model.

In some embodiments, the server is configured to enable the user to create a group for the family members, the relatives and the family friends invited for a previously held event and send the event invite to the created group.

In some embodiments, the server is configured to receive from the invitees (i) a confirmation message for attending the event, and (ii) number of adults and kids attending the event.

In some embodiments, the server is configured to automatically generate a seating plan for invitees. The seating plan is generated based on the relationship type of the invitees with the user. The seating plan is generated based on the number of adults and kids attending the event.

In some embodiments, the server is configured to automatically generate the seating plan that assigns seats for the family members of the user next to each other. A notification is sent to the invitees after the seats are assigned.

In some embodiments, the server is configured to generate a digital event badge comprising the name of the invitee, the assigned seats and a QR code. An event organizer scans the QR code using a digital communication device to authenticate the invitees attending the event.

In some embodiments, the server is configured to notify the host or the co-host of the event when the QR code of the digital event badge is scanned using the digital communication device by the event organizer.

In some embodiments, the server is configured to automatically send a welcome message and a "thank you" message to mobile devices of the invitees at the start date and end date of the event respectively based on location using GPS coordinates.

In some embodiments, the user is enabled to customize the welcome message and the "thank you" message during the generation of the event invite.

According to the third aspect of the invention, one or more non-transitory computer-readable storage mediums storing the one or more sequences of instructions, which when executed by one or more processors, causing a method for generating an event invite for a user of a family network comprising interconnected relationships and connections of the user's family members, relatives and family friends, connecting invitees of the event with the family network of the user based on relationships and building the family network with invitees of the event is provided. The method includes generating an event invite using event information obtained from the user of the family network through an interface of a user device. The event information includes at least one of the name of the event, start date and time of the event, end date and time of the event, an end date for receiving a confirmation message for attending the event from the invitees, a venue of the event, a description of the event, an invitation of the event including an image or a video of the event, weather forecast of a location of the event, a name of a host or a co-host organizing the event, and an image of the host or the co-host organizing the event. The method includes sending the event invite through a communication mode including at least one of an email, a text message or a push notification to each of the invitees through a phone number or an email ID of the invitees. The user is enabled to provide the name of the invitee and select a relationship type of the invitee. The relationship type includes the family member, the relative, or the family friend of the user. The family member is one of a father, mother, spouse, son, daughter siblings, maternal father, maternal mother, paternal father, paternal mother, father-in-law, mother-in-law, grandson, granddaughter, brother-in-law, sister-in-law, maternal and paternal aunt, maternal and paternal uncle, cousin brother, cousin sister, great-grandson, great-granddaughter, great-grandfather, great-grandmother. The method includes sending a request to the event invitee to add the event invitee to the family network of the user based on the defined relationship type while inviting the invitee to the event. The invitee is required to register as the user in the family network. The method includes automatically connecting the invitees of the event with the family network of the user by adding the invitees to the family network of the user using a machine learning model upon receiving an acceptance for the request from the invitee to add the invitee to the family network of the user. The machine learning model is configured to (i) add the invitee who is the family member of the user to a family tree of the user. The family tree comprises a plurality of branches that expose the relationship between the user and family members of the user, (ii) add the invitee who is the relative of the user to a relative section of the user's family network, and (iii) add the invitee who is the family friend of the user to a family friend section of the user's family network. The machine learning model automatically suggests the relationship type of the invitee to the user based on the provided name, email ID or phone number of the invitee if the invitees are already added to the family network of the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is a mock-up screenshot of a user interface view of the system of FIG. 1 that facilitates the user to provide the name of the invitee and select a relationship type of the invitee according to some embodiments herein;

FIGS. 9A-9B are flow diagrams that illustrate a method for building a family network with invitees to an event using a machine-learning model according to some embodiments herein;

FIG. 10 is a flow diagram that illustrates a method for obtaining person names from an event invitation and determine the relationship type of the person with a user of a family network using a machine-learning model according to some embodiments herein.

DETAILED DESCRIPTION OF PREFERRED EMBODIMENTS

Figure 1:
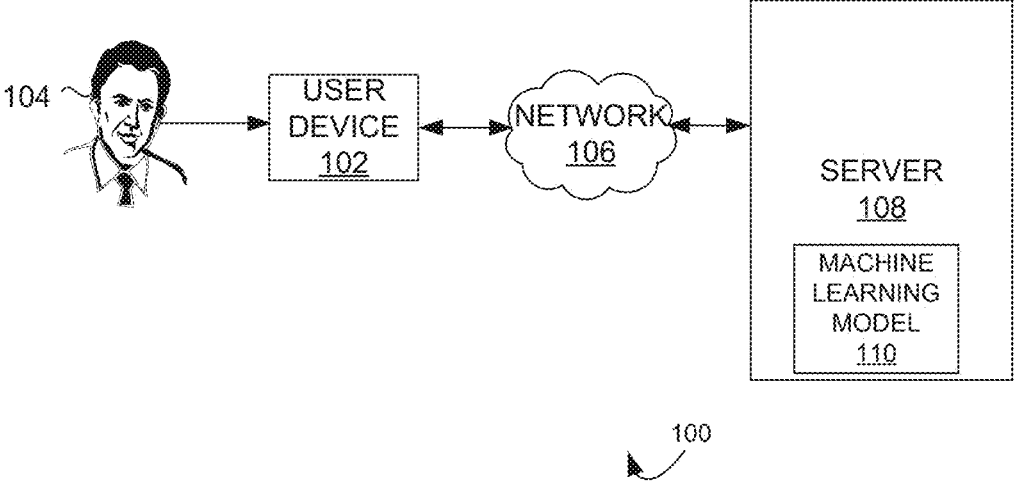
FIG. 1 is a block diagram that illustrates a system for building a family network with invitees to an event using a machine-learning model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved method and system for connecting invitees of the event with the family network of the user based on relationships and building the family network with invitees of the event. Referring now to the drawings, and more particularly to FIGS. 1 through 11, where similar reference characters denote corresponding features consistently throughout the figures, there are shown preferred embodiments.

FIG. 1 is a block diagram that illustrates a system for building a family network with invitees to an event using a machine-learning model according to some embodiments herein. The block diagram 100 includes a user device 102 associated with a user 104 of a family network, a network 106 and a server 108. The user device 102 communicates with the server 108 through the network 106. In some embodiments, the network 106 is wired. In some embodiments, the network 106 is a wireless network. In some embodiments, the network 106 is a combination of a wired network and a wireless network. In some embodiments, the network 106 is the Internet. In some embodiments, the user device 102, without limitation, may be selected from a mobile phone, a Personal Digital Assistant (PDA), a tablet, a desktop computer, or a laptop.

The server 108 is configured to generate an event invite using event information obtained from the user of the family network through an interface of the user device 102. The event information includes at least one of name of the event, start date and time of the event, end date and time of the event, end date for receiving confirmation message for attending the event from the invitees, a venue of the event, a description of the event, an invitation of the event including an image or a video of the event, weather forecast of a location of the event, a name of a host or a co-host organizing the event, and an image of the host or the co-host organizing the event. The server 108 is configured to send the event invite through a communication mode including at least one of an email, a text message or a push notification to each of the invitees through a phone number or an email ID of the invitees. The user is enabled to provide a name of the invitee and select a relationship type of the invitee. The relationship type includes the family member, the relative, or the family friend of the user. The family member is one of a father, mother, spouse, son, daughter siblings, maternal father, maternal mother, paternal father, paternal mother, father-in-law, mother-in-law, grandson, granddaughter, brother-in-law, sister-in-law, maternal and paternal aunt, maternal and paternal uncle, cousin brother, cousin sister, great-grandson, great-granddaughter, great-grandfather, great-grandmother.

The server 108 is configured to send a request to the event invitee to add the event invitee to the family network of the user based on the defined relationship type while inviting the invitee to the event. The invitee is required to register as a user in the family network. The server 108 is configured to automatically connect the invitees of the event with the family network of the user by adding the invitees to the family network of the user using a machine learning model 110 upon receiving an acceptance for the request from the invitee to add the invitee to the family network of the user. The machine learning model 110 is configured to add the invitee who is the family member of the user to a family tree of the user. The family tree comprises a plurality of branches that expose the relationship between the user and family members of the user. The family tree that exposes the relationship between the user and family members of the user is described in U.S. Pat. No. 11,625,623B2 filed on 8 Sep. 2019 and entitled: "System and method for generating a matrimony recommendation using a machine learning model" assigned to the applicant of the present invention and hereby incorporated by reference. In this patent, a method for generating a matrimony recommendation using a machine learning model is provided. The method includes generating user profiles for a first and second user, obtaining family information from their respective devices, and creating a database with the information. The method includes automatically generating family trees for both users based on a predetermined template, and populating the trees with family members based on responses from the users.

The machine learning model 110 is configured to add the invitee who is the relative of the user to a relative section of the user's family network. The machine learning model 110 is configured to add the invitee who is the family friend of the user to a family friend section of the user's family network. The machine learning model 110 automatically suggests the relationship type of the invitee to the user based on the provided name, email ID or phone number of the invitee if the invitees are already added to the family network of the user. In some embodiments, the machine learning model 110 is configured to obtain the name of the invitee from the invitation of the event and detect the relationship type of the invitee with the user from the family network using the machine learning model 110. The machine learning model is configured to scan the uploaded invitation which is in the form of video or image to obtain the event information including at least one of the name of the event, the start date and time of the event, the end date and time of the event, the end date for receiving a confirmation message for attending the event from the invitees, the venue of the event, the description of the event, the name of the host or the co-host organizing the event, and the image of the host or the co-host organizing the event. The machine learning model populates the obtained event information in the event information fields. The user who is the host of the event is enabled to update the event information populated by the machine learning model in the event information fields.

In some embodiments, the user is enabled to create a group for the family members, the relatives and the family friends invited for a previously held event and send the event invite to the created group. In some embodiments, the server 108 is configured to include receiving from the invitees (i) a confirmation message for attending the event, and (ii) number of adults and kids attending the event. In some embodiments, the server 108 is configured to automatically generate a seating plan for invitees. The seating plan is generated based on the relationship type of the invitees with the user and the number of adults and kids attending the event. The seating plan may be generated based on the relationship of the invitees determined by the machine learning model. For example, family members of the user who is the host of the event are assigned seats next to each other. The server 108 is configured to determine the relatives and their family members from a guest list from the database and assign seats next to each other. In some embodiments, the server 108 is configured to assign seats to the invitees and others attending from their side, for example, adults and kids with seats next to each other. The user who is the host of the event is enabled to change/update seating assignments of the invitees. In some embodiments, the server 108 is configured to notify the host with the automated seating done for the invitees. In some embodiments, the server 108 is configured to notify the invitees with their assigned/updated table and seat numbers.

In some embodiments, the server 108 is configured to generate a digital event badge including the name of the invitee, the assigned seats and a QR code. An event organizer may scan the QR code using a digital communication device to authenticate the invitees attending the event. In some embodiments, the server 108 is configured to notify the host or the co-host of the event when the QR code of the digital event badge is scanned using the digital communication device by the event organizer. In some embodiments, the server 108 is configured to automatically send a welcome message and a "thank you" message to mobile devices of the invitees at the start date and end date of the event respectively based on location using GPS coordinates. In some embodiments, the user is enabled to customize the welcome message and the "thank you" message during the generation of the event invite.

Figure 2:
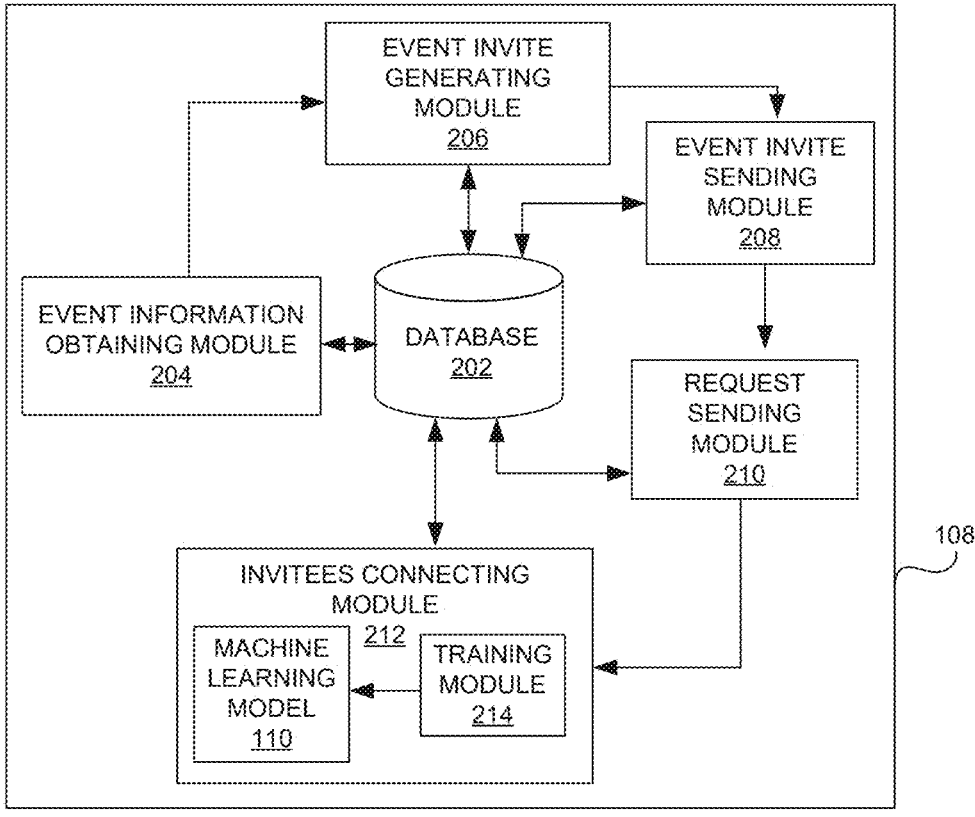
FIG. 2 is a block diagram of the server of FIG. 1 according to some embodiments herein.

FIG. 2 is a block diagram 200 of the server 108 of FIG. 1 according to some embodiments herein. The server 108 includes a database 202, an event information obtaining module 204, an event invite generating module 206, an event invite sending module 208, a request sending module 210, invitees connecting module 212, the machine learning model 110, and a training module 214.

The event information obtaining module 204 is configured to obtain the event information from the user of the family network through the interface of the user device. The event information includes at least one of a name of the event, a start date and time of the event, an end date and time of the event, an end date for receiving confirmation message for attending the event from the invitees, a venue of the event, a description of the event, an invitation of the event comprising an image or a video of the event, weather forecast of a location of the event, a name of a host or a co-host organizing the event, and an image of the host or the co-host organizing the event. The event invite generating module 206 is configured to generate an event invite using the event information. The event invite sending module 208 is configured to send the event invite through a communication mode comprising at least one of an email, a text message or a push notification to each of the invitees through a phone number or an email ID of the invitees. The user is enabled to provide the name of the invitee and select a relationship type of the invitee. The relationship type comprises the family member, the relative, or the family friend of the user. The family member is one of a father, mother, spouse, son, daughter siblings, maternal father, maternal mother, paternal father, paternal mother, father-in-law, mother-in-law, grandson, granddaughter, brother-in-law, sister-in-law, maternal and paternal aunt, maternal and paternal uncle, cousin brother, cousin sister, great-grandson, great-granddaughter, great-grandfather, great-grandmother. The request sending module 210 is configured to send a request to the event invitee to add the event invitee to the family network of the user based on the defined relationship type while inviting the invitee to the event. The invitee is required to register as a user in the family network. The invitees connecting module 212 is configured to automatically connect the invitees of the event with the family network of the user by adding the invitees to the family network of the user by the machine learning model 110 upon receiving an acceptance for the request from the invitee to add the invitee to the family network of the user. The machine learning model 110 is configured to (i) add the invitee who is the family member of the user to a family tree of the user. The family tree comprises a plurality of branches that expose the relationship between the user and family members of the user, (ii) add the invitee who is the relative of the user to a relative section of the user's family network, and (iii) add the invitee who is the family friend of the user to a family friend section of the user's family network. The machine learning model automatically suggests the relationship type of the invitee to the user based on the provided name, email ID or phone number of the invitee if the invitees are already added to the family network of the user. The machine learning model is trained using the training module 214 to determine the relationship type of the invitees with the user. The machine learning model searches the database 202 using the prompt "Family Members" to search for family members of the user forming the first degree of relation and prompt "Relatives" to search the relatives of the user forming the second degree, third degree and $n^{th}$ degree of relation from the family network.

Figure 3:
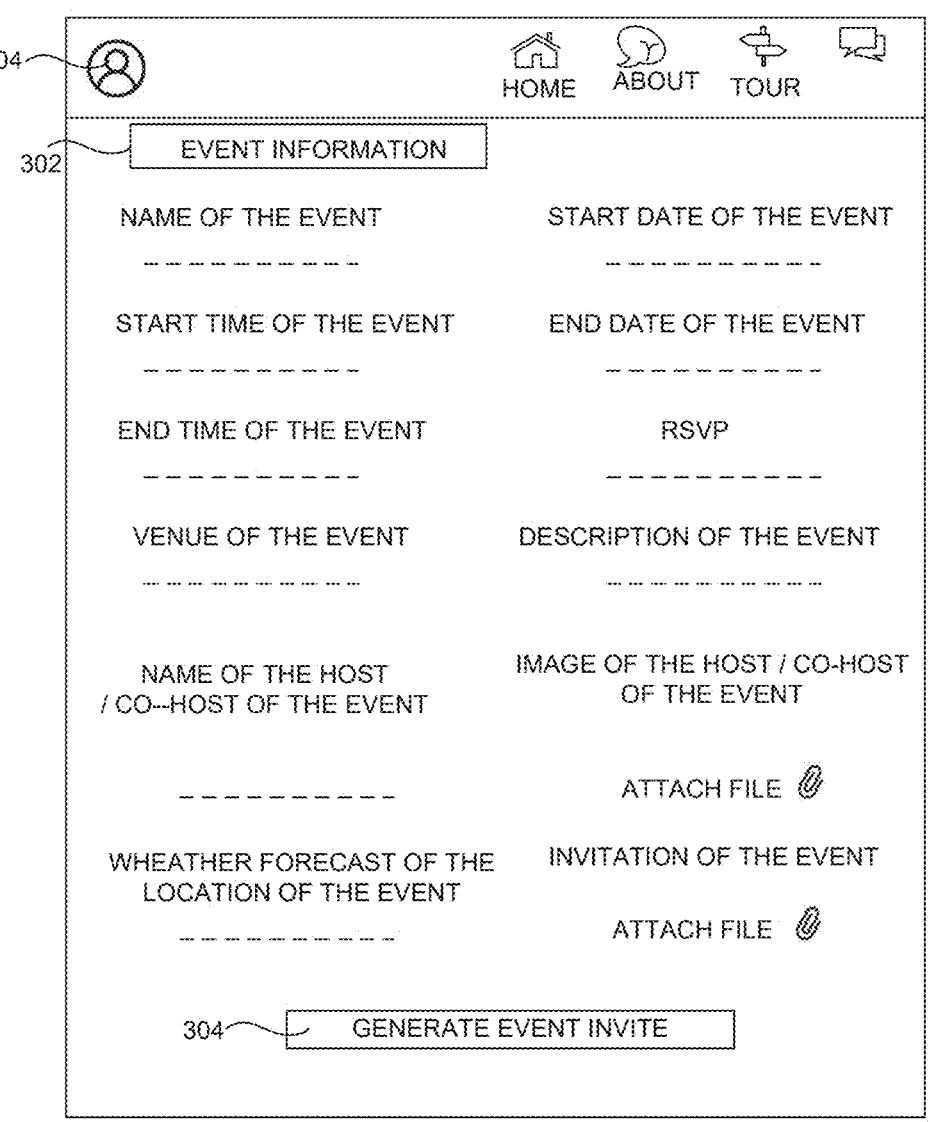
FIG. 3 is a mock-up screenshot of a user interface view of the system of FIG. 1 that enables the user to provide the event information according to some embodiments herein.

FIG. 3 is a mock-up screenshot of a user interface view 300 of the system of FIG. 1 that enable the user to provide the event information according to some embodiments herein. The event information 302 includes the name of the event, the start date and time of the event, the end date and time of the event, the end date for receiving confirmation message for attending the event from the invitees (i.e. RSVP), the venue of the event, the description of the event, the invitation of the event comprising an image or a video of the event, the weather forecast of a location of the event, the name of the host or the co-host organizing the event, and the image of the host or the co-host organizing the event. The user 104 clicks the "generate event invite" 304 to generate the event invite.

Figure 4:
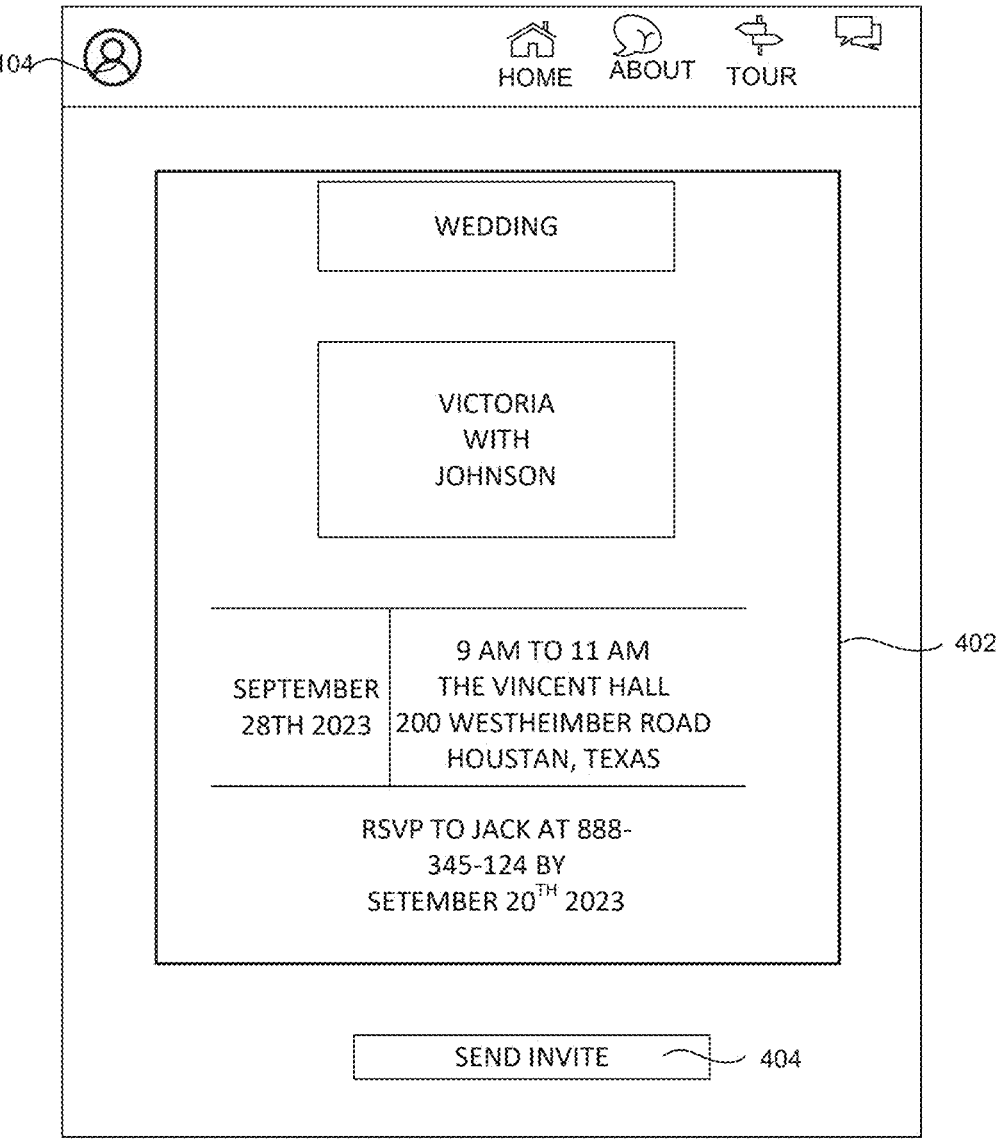
FIG. 4 is a mock-up screenshot of a user interface view of the system of FIG. 1 that shows the generated event invitation according to some embodiments herein.

FIG. 4 is a mock-up screenshot of a user interface view 400 of the system of FIG. 1 that shows the generated event invitation according to some embodiments herein. The event invitation 402 is a wedding invitation generated based on the event information obtained from the user 104. The user 104 may send the wedding invitation through an email, a text message or a push notification to each of the invitees through a phone number or an email ID of the invitees by clicking "send invite" 404.

Figure 5:
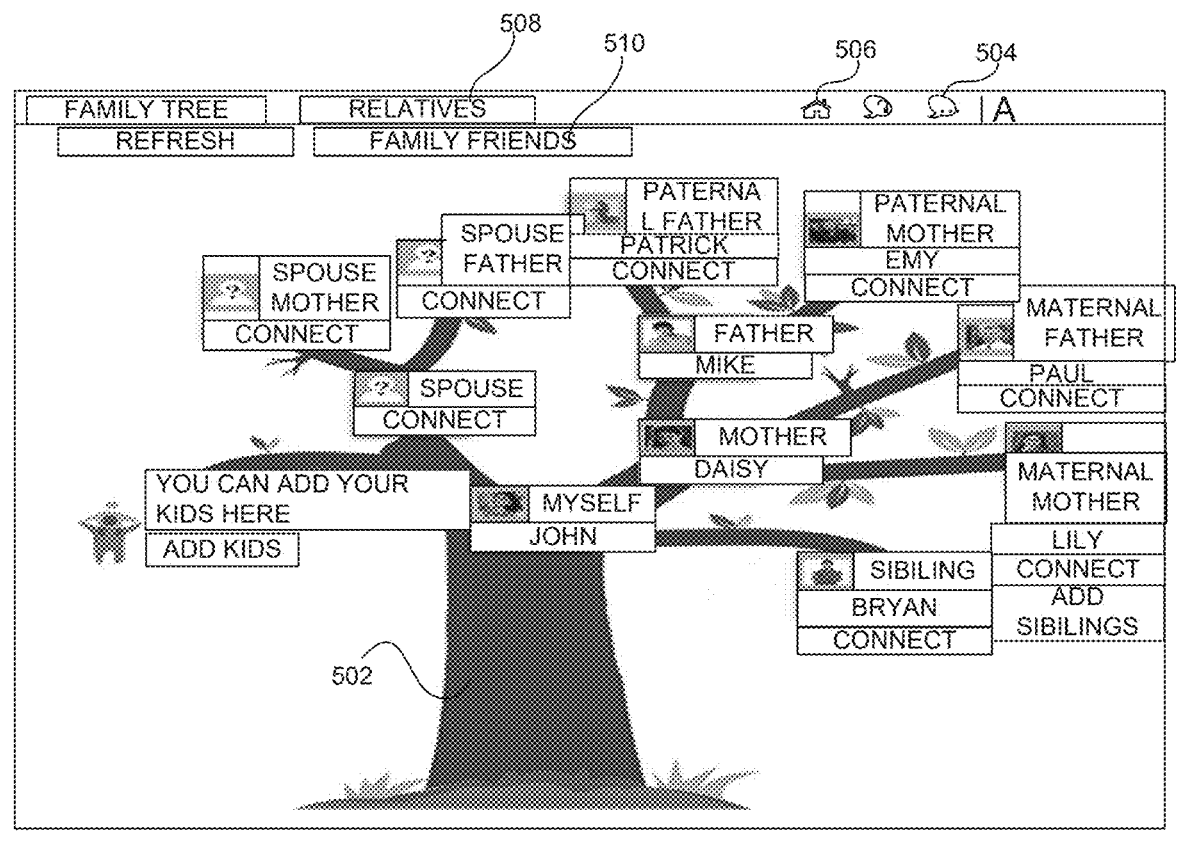
FIG. 5 is a mock-up screenshot of a user interface view of the system of FIG. 1 that illustrates a family tree according to some embodiments herein.

FIG. 5 is a mock-up screenshot of a user interface view 500 that illustrates a family tree 502 according to some embodiments herein. The user interface view 500 depicts the family tree 502 of the user 104 (i.e.) John which includes family members and relatives of John. The invitees of the event are automatically added to the family network of the user 104 using the machine learning model upon receiving an acceptance for the request from the invitee to add the invitee to the family network of the user 104. The machine learning model is configured to add the invitee who is the family member of the user 104 to a family tree of the user 104. The family tree includes a plurality of branches that expose the relationship between the user 104 and the family members of the user 104. The user 104 may access the options available in-home page and view the status of the users in the family tree by selecting home option 506. The user 104 may send a message to the family members using a message 504. The machine learning model is configured to add the invitee who is the relative of the user 104 to a relative section 508 of the user's family network, and add the invitee who is the family friend of the user 104 to a family friend section 510 of the user's family network.

FIG. 6 is a mock-up screenshot of a user interface view 600 of the system of FIG. 1 that facilitates the user to provide the name of the invitee and select a relationship type of the invitee according to some embodiments herein. The user interface 600 enables the user 104 to provide the name of the invitee 602 and select the relationship type 604 of the invitee including the family member, the relative, or the family friend of the user 104. The family member is one of a father, mother, spouse, son, daughter siblings, maternal father, maternal mother, paternal father, paternal mother, father-in-law, mother-in-law, grandson, granddaughter, brother-in-law, sister-in-law, maternal and paternal aunt, maternal and paternal uncle, cousin brother, cousin sister, great-grandson, great-granddaughter, great-grandfather, great-grandmother. The user 104 may send the invite 606 by clicking the "send invite" option.

Figure 7:
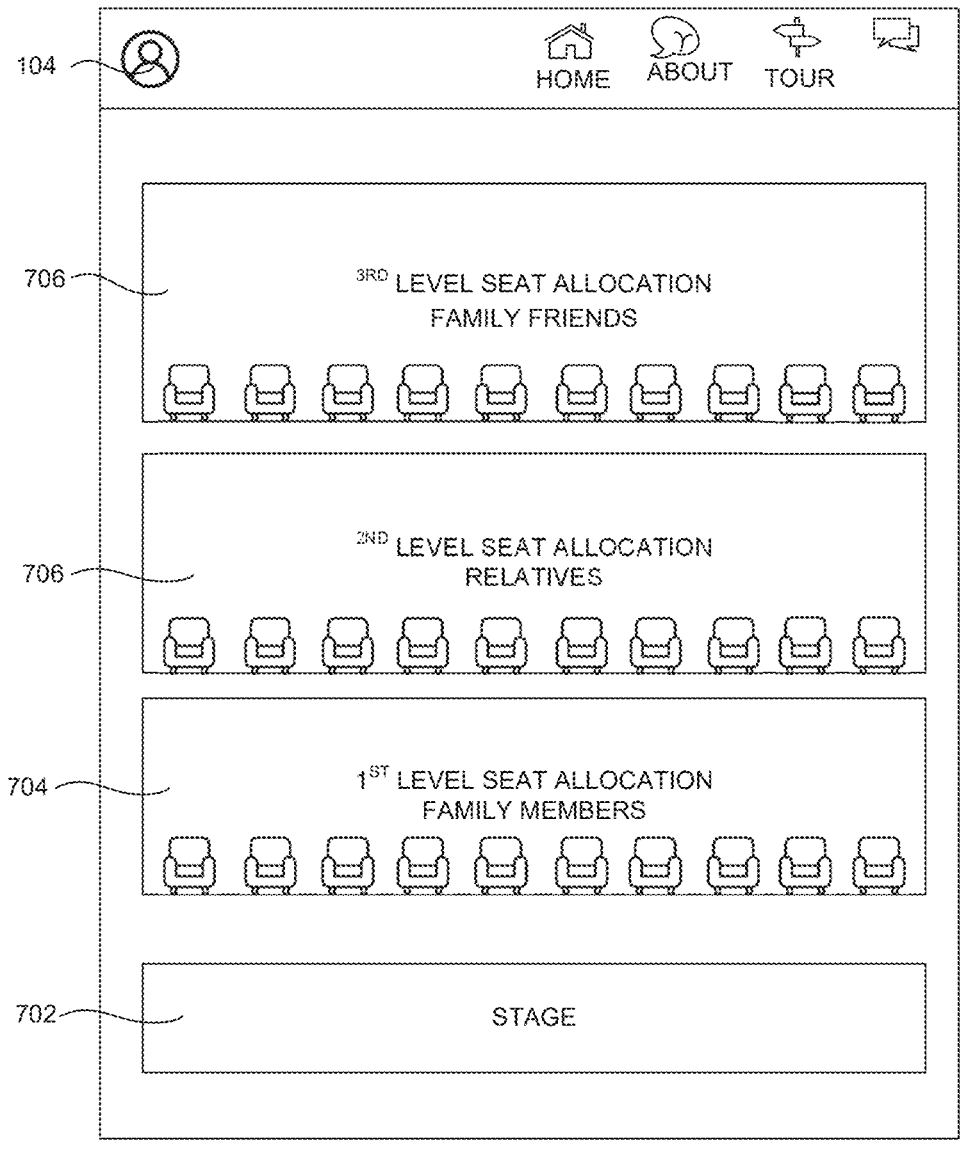
FIG. 7 is a mock-up screenshot of a user interface view that illustrates a seating arrangement for the invitees generated by the system of FIG. 1 according to some embodiments herein.

FIG. 7 is a mock-up screenshot of a user interface view 700 that illustrates a seating arrangement for the invitees generated by the system of FIG. 1 according to some embodiments herein. The user interface 700 provides a seating plan for invitees. The seating plan is generated based on the relationship type of the invitees with the user 104. The seating plan is generated based on the number of adults and kids attending the event. The seats are assigned to the family members of the user 104 next to each other. A notification is sent to the invitees after the seats are assigned. The user interface 700 includes a stage 702. The first level of seat allocation 704 includes the family members. The second level of seat allocation 706 includes relatives. The third level of seat allocation 708 includes the family friends.

Figure 8:
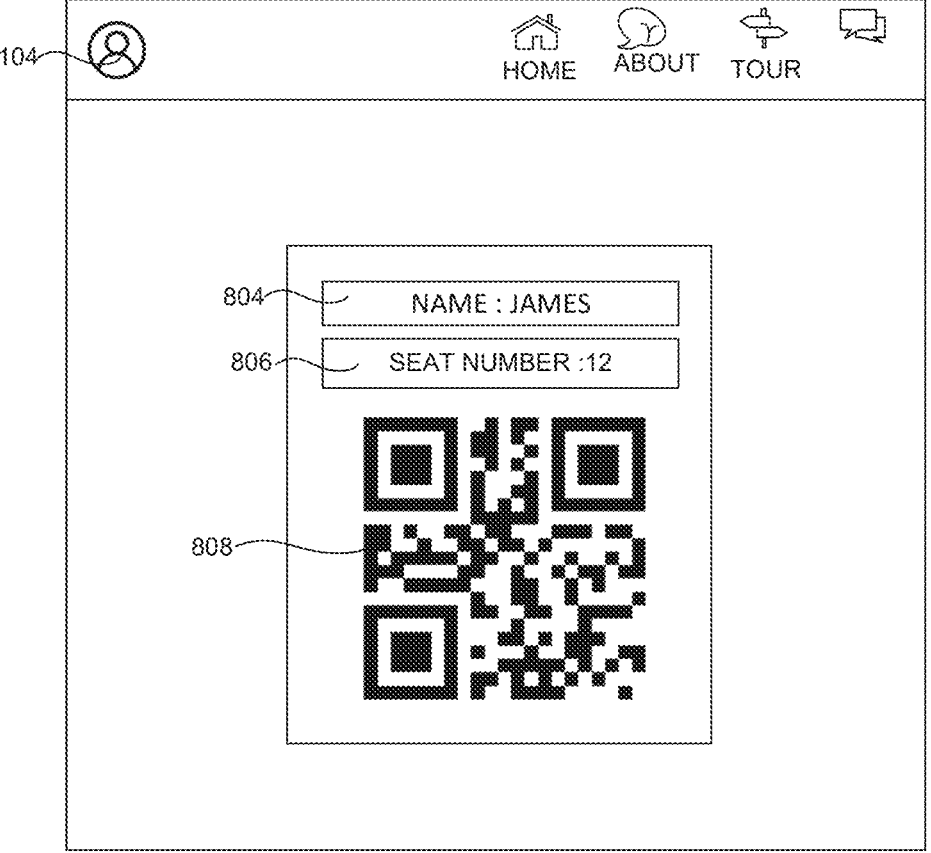
FIG. 8 is a mock-up screenshot of a user interface view that illustrates a digital event badge generated by the system of FIG. 1 according to some embodiments herein.

FIG. 8 is a mock-up screenshot of a user interface view 800 that illustrates a digital event badge 802 generated by the system of FIG. 1 according to some embodiments herein. The digital event badge 802 includes the name of the invitee 804, the assigned seat number 806 for the invitee 804 and a QR code 808. An event organizer scans the QR code 808 using a digital communication device to authenticate the invitees attending the event.

FIGS. 9A-9B are flow diagrams that illustrate a method for building a family network with invitees to an event using a machine-learning model according to some embodiments herein. At step 902, the method includes generating an event invite using event information obtained from the user of the family network through an interface of a user device, the event information comprises at least one of a name of the event, a start date and time of the event, an end date and time of the event, an end date for receiving a confirmation message for attending the event from the invitees, a venue of the event, a description of the event, an invitation of the event comprising an image or a video of the event, weather forecast of a location of the event, a name of a host or a co-host organizing the event, and an image of the host or the co-host organizing the event. At step 904, the method includes sending the event invite through a communication mode comprising at least one of an email, a text message or a push notification to each of the invitees through a phone number or an email ID of the invitees. The user is enabled to provide the name of the invitee and select a relationship type of the invitee. The relationship type comprises the family member, the relative, or the family friend of the user. The family member is one of a father, mother, spouse, son, daughter siblings, maternal father, maternal mother, paternal father, paternal mother, father-in-law, mother-in-law, grandson, granddaughter, brother-in-law, sister-in-law, maternal and paternal aunt, maternal and paternal uncle, cousin brother, cousin sister, great-grandson, great-granddaughter, great-grandfather, great-grandmother. At step 906, the method includes sending a request to the event invitee to add the event invitee to the family network of the user based on the defined relationship type while inviting the invitee to the event. The invitee is required to register as a user in the family network. At step 908, the method includes automatically connecting the invitees of the event with the family network of the user by adding the invitees to the family network of the user upon receiving an acceptance for the request from the invitee to add the invitee to the family network of the user. The machine learning model is configured to (i) add the invitee who is the family member of the user to a family tree of the user. The family tree comprises a plurality of branches that expose the relationship between the user and family members of the user, (ii) add the invitee who is the relative of the user to a relative section of the user's family network, and (iii) add the invitee who is the family friend of the user to a family friend section of the user's family network. The machine learning model automatically suggest the relationship type of the invitee to the user based on the provided name, email ID or phone number of the invitee if the invitees are already added to the family network of the user.

FIG. 10 is a flow diagram that illustrates a method for obtaining person names from an event invitation and determining the relationship type of the person with a user of a family network using a machine-learning model according to some embodiments herein. At step 1002, the method includes scanning the event invitation which is in the form of a video or an image to obtain the person names using the machine learning model. At step 1004, the method includes searching a database of the family network to determine if the obtained person names match the names of the family members or relatives of the user using the machine learning model. At step 1006, the method includes auto-populating the relationship type of matched persons in the family network of the user if the matched persons are invited for the event.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
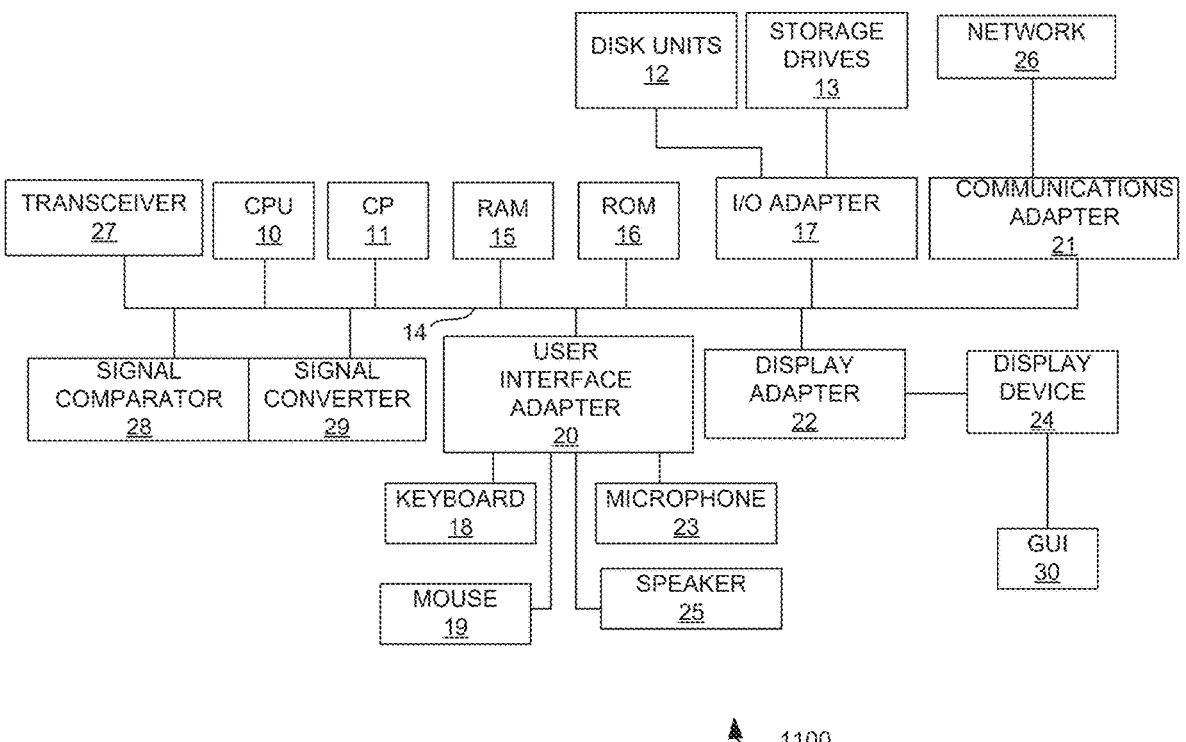
FIG. 11 is a block diagram of a schematic diagram of a device used in accordance with embodiments herein.

A representative hardware environment for practicing the embodiments herein is depicted in FIG. 11, with reference to FIGS. 1 through 10. This schematic drawing illustrates a hardware configuration of a server/computer system/user device in accordance with the embodiments herein. The user device includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for automatically generating and authenticating a machine-readable event-access credential by constructing a relationship-based data structure that associates event invitees with a user's family network, wherein the system autonomously builds and updates the family network based on invitee-specific identity data and relationship types, the method comprises, receiving invitee-specific data comprising at least one of a name, an email ID, or a phone number, and receiving a selected relationship type associated with the invitee, wherein the relationship type comprises a family member, a relative, or a family friend of the user, wherein the family member is one of a father, mother, spouse, son, daughter siblings, maternal father, maternal mother, paternal father, paternal mother, father-in-law, mother-in-law, grandson, granddaughter, brother-in-law, sister-in-law, maternal and paternal aunt, maternal and paternal uncle, cousin brother, cousin sister, great-grandson, great-granddaughter, great-grandfather, great-grandmother;

automatically connecting the invitees of the event with the family network of the user using a machine learning model by (i) classifying the invitee, using the relationship type received for the invitee, into a corresponding section of the family network implementing a family tree with plural relational branches, a relative section, or a family-friend section; and (ii) automatically determining the relationship type of the invitee to the user based on the invitee-specific data comprising at least one of a name, an email ID, or a phone number when the invitee is already present in the family network of the user; and (iii) adding the invitees to the family network of the user upon receiving an acceptance for the request from the invitee to add the invitee to the family network of the user;

authenticating the invitee during event check-in by automatically generating an event-specific seating plan based on the classified relationship type to position family-member invitees adjacent to one another, wherein adult and child attendance counts are received from the invitees;

encoding assigned seat information into a digital event badge, generating a QR code that encodes the seat information and invitee identifier, and transmitting the digital event badge to the invitee for display on a user device; and capturing, using a digital communication device, the QR code encoded within the digital event badge to authenticate the invitee, decoding the machine-readable code to obtain the invitee-identification data and assigned-seat information.

2. The processor-implemented method of claim 1, wherein the machine learning model is configured to obtain the name of the invitee from an event invite and detects the relationship type of the invitee with the user from the family network, wherein the event invite is generated using event information obtained from the user of the family network through an interface of the user device, wherein the event information comprises at least one of a name of the event, a start date and time of the event, an end date and time of the event, an end date for receiving a confirmation message for attending the event from the invitees, a venue of the event, a description of the event, an invitation of the event comprising an image or a video of the event, weather forecast of a location of the event, a name of a host or a co-host organizing the event, and an image of the host or the co-host organizing the event.

3. The processor-implemented method of claim 1, wherein the method enables the user to create a group comprising the family members, the relatives and the family friends invited for a previously held event and send an event invite to the created group.

4. The processor-implemented method of claim 1, wherein a notification is sent to the invitees after the seats are assigned.

5. The processor-implemented method of claim 1, wherein the method includes notifying a host or a co-host of the event when the QR code of the digital event badge is scanned using the digital communication device by an event organizer.

6. The processor-implemented method of claim 1, wherein the method further comprises automatically sending a welcome message and a "thank you" message to mobile devices of the invitees at the start date and end date of the event respectively based on the invitees' presence at the event venue determined using GPS coordinates.

7. The processor-implemented method of claim 6, wherein the user is enabled to customize the welcome message and the "thank you" message during the generation of an event invite.

8. A system for automatically generating and authenticating a machine-readable event-access credential by constructing a relationship-based data structure that associates event invitees with a user's family network, wherein the system autonomously builds and updates the family network based on invitee-specific identity data and relationship types, the system comprising:

a server comprising a memory that stores a set of instructions; and a processor that executes the set of instructions and is configured to receive invitee-specific data comprising at least one of a name, an email ID, or a phone number, and receiving a selected relationship type associated with the invitee, wherein the relationship type comprises a family member, a relative, or a family friend of the user, wherein the family member is one of a father, mother, spouse, son, daughter siblings, maternal father, maternal mother, paternal father, paternal mother, father-in-law, mother-in-law, grandson, granddaughter, brother-in-law, sister-in-law, maternal and paternal aunt, maternal and paternal uncle, cousin brother, cousin sister, great-grandson, great-granddaughter, great-grandfather, great-grandmother;

automatically connect the invitees of the event with the family network of the user using a machine learning model by (i) classifying the invitee, using the relationship type received for the invitee, into a corresponding section of the family network implementing a family tree with plural relational branches, a relative section, or a family-friend section; and (ii) automatically determining the relationship type of the invitee to the user based on the invitee-specific data comprising at least one of a name, an email ID, or a phone number when the invitee is already present in the family network of the user; and (iii) adding the invitees to the family network of the user upon receiving an acceptance for the request from the invitee to add the invitee to the family network of the user;

authenticating the invitee during event check-in by automatically generate an event-specific seating plan based on the classified relationship type to position family-member invitees adjacent to one another, wherein adult and child attendance counts are received from the invitees;

encode assigned seat information into a digital event badge, generating a QR code that encodes the seat information and invitee identifier, and transmitting the digital event badge to the invitee for display on a user device; and capture, using a digital communication device, the QR code encoded within the digital event badge to authenticate the invitee, decoding the machine-readable code to obtain the invitee-identification data and assigned-seat information.

9. The system of claim 8, wherein the machine learning model is configured to obtain the name of the invitee from an event invite and detects the relationship type of the invitee with the user from the family network, wherein the event invite is generated using event information obtained from the user of the family network through an interface of the user device, wherein the event information comprises at least one of a name of the event, a start date and time of the event, an end date and time of the event, an end date for receiving a confirmation message for attending the event from the invitees, a venue of the event, a description of the event, an invitation of the event comprising an image or a video of the event, weather forecast of a location of the event, a name of a host or a co-host organizing the event, and an image of the host or the co-host organizing the event.

10. The system of claim 8, wherein the server is configured to enable the user to create a group comprising the family members, the relatives and the family friends invited for a previously held event and send an event invite to the created group.

11. The system of claim 8, wherein a notification is sent to the invitees after the seats are assigned.

12. The system of claim 8, wherein the server is configured to notify a host or a co-host of the event when the QR code of the digital event badge is scanned using the digital communication device by the event organizer.

13. The system of claim 8, wherein the server is configured to automatically send a welcome message and a "thank you" message to mobile devices of the invitees at the start date and end date of the event respectively based on the invitees' presence at the event venue determined using GPS coordinates, wherein the user is enabled to customize the welcome message and the "thank you" message during the generation of an event invite.

14. One or more non-transitory computer-readable storage mediums storing the one or more sequences of instructions, which when executed by one or more processors, further causes a method for automatically generating and authenticating a machine-readable event-access credential by constructing a relationship-based data structure that associates event invitees with a user's family network, wherein the system autonomously builds and updates the family network based on invitee-specific identity data and relationship types, the method comprises, receiving invitee-specific data comprising at least one of a name, an email ID, or a phone number, and receiving a selected relationship type associated with the invitee, wherein the relationship type comprises a family member, a relative, or a family friend of the user, wherein the family member is one of a father, mother, spouse, son, daughter siblings, maternal father, maternal mother, paternal father, paternal mother, father-in-law, mother-in-law, grandson, granddaughter, brother-in-law, sister-in-law, maternal and paternal aunt, maternal and paternal uncle, cousin brother, cousin sister, great-grandson, great-granddaughter, great-grandfather, great-grandmother;

automatically connecting the invitees of the event with the family network of the user using a machine learning model by (i) classifying the invitee, using the relationship type received for the invitee, into a corresponding section of the family network implementing a family tree with plural relational branches, a relative section, or a family-friend section; and (ii) automatically determining the relationship type of the invitee to the user based on the invitee-specific data comprising at least one of a name, an email ID, or a phone number when the invitee is already present in the family network of the user; and (iii) adding the invitees to the family network of the user upon receiving an acceptance for the request from the invitee to add the invitee to the family network of the user;

authenticating the invitee during event check-in by automatically generating an event-specific seating plan based on the classified relationship type to position family-member invitees adjacent to one another, wherein adult and child attendance counts are received from the invitees;

encoding assigned seat information into a digital event badge, generating a QR code that encodes the seat information and invitee identifier, and transmitting the digital event badge to the invitee for display on a user device; and capturing, using a digital communication device, the
   QR code encoded within the digital event badge to
   authenticate the invitee, decoding the machine-
   readable code to obtain the invitee-identification
   data and assigned-seat information.

* * * * *